United States Patent
Minto

(10) Patent No.: US 8,909,454 B2
(45) Date of Patent: Dec. 9, 2014

(54) CONTROL OF COMPRESSION SYSTEM WITH INDEPENDENTLY ACTUATED INLET GUIDE AND/OR STATOR VANES

(75) Inventor: Karl Dean Minto, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 13/083,056

(22) Filed: Apr. 8, 2011

(65) Prior Publication Data

US 2012/0259528 A1  Oct. 11, 2012

(51) Int. Cl.
| | | |
|---|---|---|
| G06F 19/00 | (2011.01) | |
| F01D 7/00 | (2006.01) | |
| F03B 3/00 | (2006.01) | |
| F01D 17/12 | (2006.01) | |
| F01B 25/00 | (2006.01) | |
| F04D 29/56 | (2006.01) | |
| F01D 17/16 | (2006.01) | |
| F04D 27/02 | (2006.01) | |

(52) U.S. Cl.
CPC .............. F04D 29/563 (2013.01); F01D 17/16 (2013.01); F04D 27/0246 (2013.01)
USPC ............. 701/100; 415/125; 415/148; 415/48; 415/149.1

(58) Field of Classification Search
USPC ........................................................ 701/100
See application file for complete search history.

(56) References Cited

U.S. PATENT DOCUMENTS

| | | | | |
|---|---|---|---|---|
| 3,779,665 | A * | 12/1973 | Tatem et al. ................... | 415/123 |
| 5,042,245 | A * | 8/1991 | Zickwolf, Jr. ................... | 60/773 |
| 5,044,879 | A * | 9/1991 | Farrar ............................ | 415/150 |
| 5,281,087 | A * | 1/1994 | Hines ............................. | 415/160 |
| 5,993,152 | A * | 11/1999 | Schilling ........................ | 415/160 |
| 6,402,487 | B1* | 6/2002 | Clements et al. ............... | 418/26 |
| 6,466,858 | B1* | 10/2002 | Adibhatla et al. .............. | 701/100 |
| 6,763,664 | B2 | 7/2004 | Aoyama | |
| 7,188,019 | B2 | 3/2007 | Nomura et al. | |
| 2002/0189263 | A1* | 12/2002 | Rayer et al. ..................... | 60/782 |
| 2003/0074884 | A1* | 4/2003 | Snow et al. ..................... | 60/204 |
| 2004/0123600 | A1* | 7/2004 | Brunell et al. .................. | 60/773 |
| 2004/0187473 | A1* | 9/2004 | Rowe ........................ | 60/39.281 |
| 2005/0147492 | A1* | 7/2005 | Mahoney et al. .............. | 415/148 |

(Continued)

FOREIGN PATENT DOCUMENTS

| | | | | |
|---|---|---|---|---|
| DE | 3624951 C1 * | 10/1987 | ............. | F04D 25/00 |
| EP | 2148044 A2 | 1/2010 | | |

OTHER PUBLICATIONS

Machine translation of DE 3624951 C1 to English, retrieved Feb. 10, 2014 from Espacenet.*

*Primary Examiner* — Calvin Cheung
*Assistant Examiner* — Krishnan Ramesh
(74) *Attorney, Agent, or Firm* — Hoffman Warnick LLC; Ernest G. Cusick

(57) ABSTRACT

A compression system includes a compressor with adjustable inlet guide vanes (IGVs) and variable stator vanes (VSVs) that are adjustable independently of each other. IGV and VSV control units produce respective IGV and VSV reference commands responsive to respective first and second inputs that may be responsive to measured properties of the compression system. The second input may be provided by a model of the compressor or of the compression system responsive to measured properties. The second input may particularly be an estimate of a property not directly observable, such as stall margin or efficiency.

14 Claims, 6 Drawing Sheets

(56) References Cited

U.S. PATENT DOCUMENTS

| | | | |
|---|---|---|---|
| 2006/0101826 A1* | 5/2006 | Martis et al. | 60/794 |
| 2007/0020094 A1* | 1/2007 | Giaimo et al. | 415/160 |
| 2008/0226439 A1 | 9/2008 | Guemmer | |
| 2008/0264067 A1* | 10/2008 | Flucker et al. | 60/793 |
| 2009/0155057 A1* | 6/2009 | Suciu et al. | 415/145 |
| 2009/0208329 A1* | 8/2009 | Bertino | 415/162 |
| 2009/0232643 A1* | 9/2009 | Norris et al. | 415/151 |
| 2009/0297334 A1* | 12/2009 | Norris et al. | 415/49 |
| 2010/0021285 A1* | 1/2010 | Rowe et al. | 415/125 |
| 2010/0083668 A1* | 4/2010 | Foster et al. | 60/801 |
| 2010/0300062 A1* | 12/2010 | Ewens et al. | 60/39.24 |
| 2011/0197593 A1* | 8/2011 | Fuchs et al. | 60/773 |
| 2011/0268554 A1* | 11/2011 | Minto et al. | 415/1 |
| 2012/0039706 A1* | 2/2012 | Selmeier et al. | 415/129 |
| 2012/0134783 A1* | 5/2012 | Davidson et al. | 415/148 |
| 2012/0230840 A1* | 9/2012 | Fletcher et al. | 417/43 |
| 2012/0259528 A1* | 10/2012 | Minto | 701/100 |
| 2012/0269613 A1* | 10/2012 | Mills et al. | 415/48 |
| 2012/0317955 A1* | 12/2012 | Rowe et al. | 60/39.01 |
| 2013/0028716 A1* | 1/2013 | Bouru et al. | 415/150 |
| 2013/0061601 A1* | 3/2013 | Fuller et al. | 60/787 |

* cited by examiner

CONTROL OF COMPRESSION SYSTEM WITH INDEPENDENTLY ACTUATED INLET GUIDE AND/OR STATOR VANES

BACKGROUND OF THE INVENTION

The disclosure relates generally to the control of a compression system with independently actuated inlet guide and/or stator vanes, and, more particularly, to a method and apparatus for control of a gas turbine with such vanes.

Modern gas turbine compression systems must operate over a wide set of conditions, including varying flows, speeds, pressure ratios, and ambient conditions, while addressing multiple, often conflicting requirements such as efficiency and operability. The control of gas turbine compression systems is typically limited to one degree of freedom, which limits the extent to which the control system can tradeoff competing objectives such as efficiency and operability. A system with more degrees of freedom, such as a two degree of freedom compression system, would provide the opportunity for improved control of competing requirements such as efficiency and operability as compared with the traditional one degree of freedom compression system. For example, a two degree of freedom gas turbine system could have enhanced turndown capability with superior operating efficiency as compared with typical systems, an improvement in the efficacy of on-line compressor water-wash systems, and/or improved compressor stability over a wide range of power plant operations, including startup and shutdown transients and hot-day lapse rate.

BRIEF DESCRIPTION OF THE INVENTION

Embodiments of the invention disclosed herein include a compression system comprising a compressor with at least one adjustable inlet guide vane (IGV) disposed at an inlet end of the compressor, and at least one variable stator vane (VSV) disposed at the inlet end of the compressor downstream from the at least one IGV. The at least one VSV is adjustable independently of the at least one IGV and the at least one IGV is adjustable independently of the at least one VSV. A compression control system includes a controller that includes an IGV control unit and a VSV control unit. At least a first device is configured to communicate with the compression control system and to provide at least a first compressor property value to the compression control system. Similarly, at least a second device is configured to communicate with the compression control system and to provide at least a second compressor property value to the compression control system. The IGV control unit produces an IGV position reference command responsive to at least one of the first and second devices, and the VSV control unit produces a VSV position reference command responsive to at least one of the first and second devices. A guide vane positioning system is configured to communicate with the controller to produce, responsive to at least the IGV position reference command, an IGV position command, and to produce, responsive to at least the VSV position reference command, a VSV position command.

Another embodiment is a compression system control method, the compression system including a compressor, a guide vane positioning system, at least one adjustable inlet guide vane (IGV) responsive to the guide vane positioning system, and at least one variable stator vane (VSV) responsive to the guide vane positioning system. The method provides an IGV control unit configured to communicate with at least a first device and to receive at least a first compressor property value therefrom. Responsive to at least the first compressor property value, an IGV position reference command is produced with the IGV control unit and sent to the guide vane positioning system. The method provides a VSV control unit configured to communicate with at least a second device and to receive at least a second compressor property value therefrom. Responsive to at least the second compressor property value, a VSV position reference command is produced with the VSV control unit and is sent to the guide vane positioning system.

Another embodiment has a computer product for controlling a compression system, the compression system including at least one compressor, at least one adjustable inlet guide vane (IGV), at least one variable stator vane (VSV), and at least one guide vane positioning system. The guide vane positioning system includes at least one IGV positioning system configured to change a respective position of the at least one IGV and at least one VSV positioning system configured to change a respective position of the at least one VSV. The computer product comprises instructions in the form of computer executable program code stored on a computer readable storage medium and including program code for using an IGV control unit to produce an IGV reference command responsive to at least a first device configured to provide a first compressor property value. Program code is also included for using a VSV control unit to produce a VSV reference command responsive to at least a second device configured to provide a second compressor property value. Further program code is included for producing an IGV position command responsive to the IGV reference command and for sending the IGV position command to the at least one IGV positioning system. Program code for producing a VSV position command responsive to the VSV reference command and for sending the VSV position command to the at least one VSV positioning system is also part of the computer product.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

As indicated above, aspects of the invention provide a system, method, and computer storage product for controlling a compression system that is particularly suited to controlling a gas turbine powered compressor with independently actuated inlet guide vanes and stator vanes. It should be noted that a gas turbine engine incorporates a compression system since it includes a compressor. Thus, embodiments may be applied to standalone gas turbines, ducted fan gas turbine engines, gas turbines used as power sources for other systems, and any compression system including an adjustable inlet guide vane (IGV) and an adjustable variable stator vane (VSV), the IGV being adjustable independent of the VSV and vice versa. In addition, as used herein, unless otherwise noted, the term "set" means one or more (i.e., at least one) and the phrase "any solution" means any now known or later developed solution.

Figure 1:
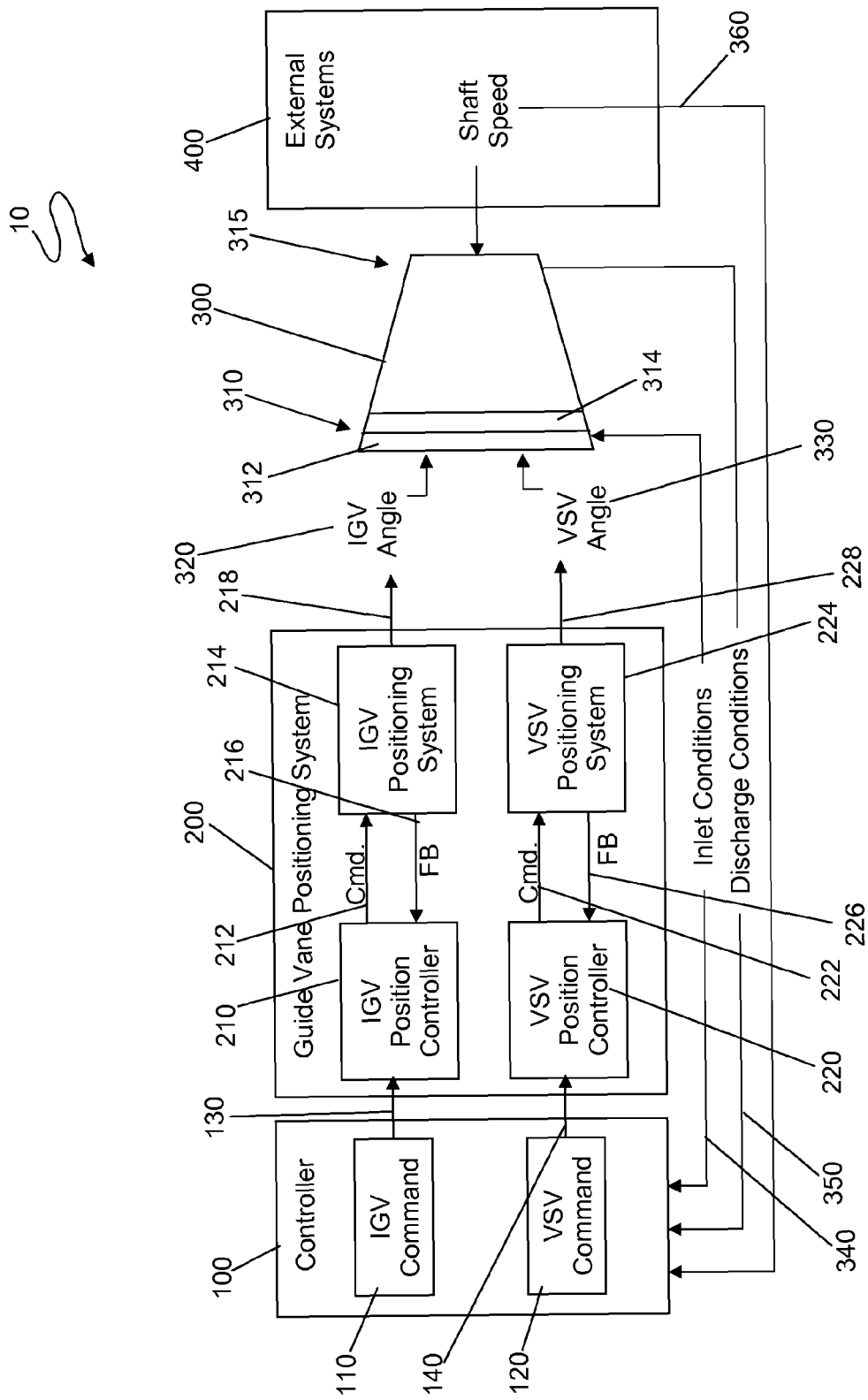
FIG. 1 shows a schematic diagram of a compression system and controls therefore according to embodiments of the invention disclosed herein.

With reference to the accompanying drawings, FIG. 1 shows a schematic diagram of compression system 10 in which embodiments may be employed. Compression system 10 may include a controller 100 configured to communicate with a guide vane positioning system 200 for a compressor 300. Compressor 300 has an inlet end 310 and an exhaust, discharge, or exit end 315. Embodiments include one or more stages of inlet guide vanes (IGVs) 312 and/or stator vanes 314, particularly adjustable IGVs and variable stator vanes (VSVs). Guide vane positioning system 200 adjusts the positions of IGVs 312 and VSVs 314 of compressor 300. Controller 100 and/or compressor 300 may communicate with and/or be connected to one or more external systems 400, such as pipes, valves, motors, turbines, or any other external systems as may be desired and/or appropriate, now known and/or later developed and/or discovered.

Controller 100 includes an IGV command module 110 and a VSV command module 120, which issue respective commands 130, 140, such as position reference commands, to guide vane positioning system 200 to control position of IGVs 312 and/or VSVs 314 of compressor 300. Controller 100 in embodiments receives input data, such as inlet conditions 340 of compressor 300, discharge conditions 350 of compressor 300, and/or shaft speed 360 of compressor 300. For example, controller 100 may receive flow rate, pressure, and/or temperature from the inlet and/or discharge of compressor 300.

IGV position reference commands 130 issued by controller 100 may be received by IGV position controller 210 of guide vane positioning system 200. In response to these commands, IGV position controller 210 sends position commands 212 to an IGV positioning system 214, which also sends position feedback information 216 back to IGV position controller 210. IGV positioning system 214 issues IGV angle commands 218 to compressor 300.

VSV position reference commands 140 issued by controller 100 may be received by a VSV position controller 220 of guide vane positioning system 200. In response to these commands, VSV position controller 220 sends position commands 222 to a VSV positioning system 224, which also sends position feedback information 226 back to VSV position controllers 220. VSV positioning system 224 issues VSV angle commands 228 to compressor 300.

Figure 2:
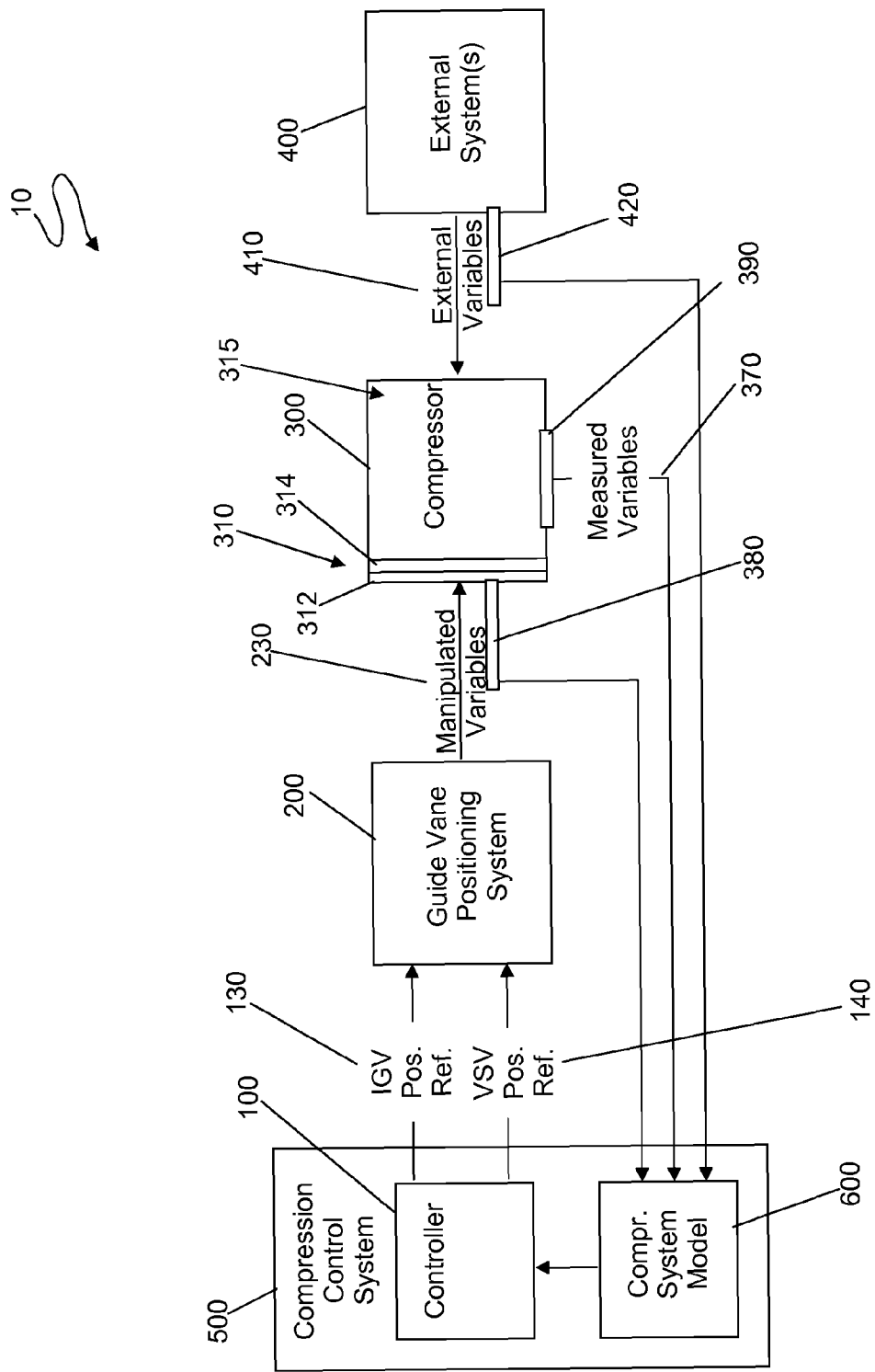
FIG. 2 shows a schematic diagram of a compression system similar to that shown in FIG. 1 with more detail related to the compression control system.

Turning now to FIG. 2, controller 100 may be part of a compression control system 500, which may also include a compression system model 600 in embodiments. Controller 100 sends IGV and VSV position reference commands 130, 140 to guide vane positioning system 200 as in the arrangement shown in FIG. 1, but it is compression system model 600 that may receive manipulated variables 230, including, for example, IGV and VSV angle commands 218, 228. Manipulated variables 230 are called "manipulated" because they include any variable directly controlled by controller 100 and/or compression control system 500.

As is typical in the art, compressor 300 and/or compression system 10 may be fitted with various devices, such as sensors, to measure inlet, discharge, and other conditions, properties and/or variables relevant to monitoring, operating, and/or controlling compressor 300, such as flow rate, pressure, temperature, rotational speed, and the like. In embodiments, for example, first sensors 380, second sensors 390, and/or third sensors 420 may be used to send values of manipulated variables 230, inlet conditions 340, measured variables 370, discharge conditions 350, and/or external variables 410, such as shaft speed 360 and/or exhaust temperature $T_{ex}$, to controller 100. In embodiments, connections over which some property values, such as inlet conditions 340 and/or shaft speed 360, are sent may be two-way, so that controller 100 may effect a change in such properties, such as to enhance operation of compressor. As seen in the example of FIG. 2, the manipulated variables 230 may, in embodiments, be measured by first sensors 380. In addition, compression system model 600 may receive measured variables 370 measured by second sensors 380, including, for example, inlet and discharge conditions 340, 350, as well as external variables 410 measured by second sensors 420, such as exhaust temperature $T_{ex}$. It should be noted that measurement of $T_{ex}$ has particular applicability in an arrangement in which compression system 10 is part of a larger system, such as a gas turbine, but other variables may be more applicable in other arrangements or embodiments. Compression system model 600 employs input data and, in embodiments, predefined information, such as performance maps, to influence actions of controller 100, such as to enhance operating efficiency. For example, compression system model 600 may use inputs and predefined information to provide controller 100 with estimates of properties and/or variables not available from direct measurement, such as efficiency and/or stall margin, which controller 100 may use to enhance control and operation of compressor 300.

Figure 3:
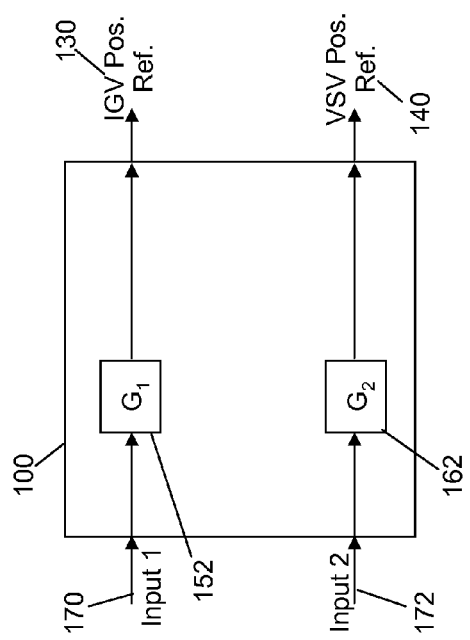

With reference to FIGS. 3-7, controller 100 may include a two degree of freedom control system since IGV and VSV position may be independently controlled. Controller 100 may be regarded as including an IGV channel 150 and a VSV channel 160 receiving respective first and second inputs 170, 172, as seen particularly in FIG. 7. In FIG. 3, a fully independent arrangement is shown in which IGV channel 150 receives first input 170, processes it with first IGV control unit 152, and sends IGV position reference command 130 to guide vane positioning system 200 (not shown in FIG. 3). VSV channel 160 receives second input 172, processes it with first VSV control unit 162, and sends VSV position reference command 140 to guide vane positioning system 200 (not shown in FIG. 3).

Figure 4:
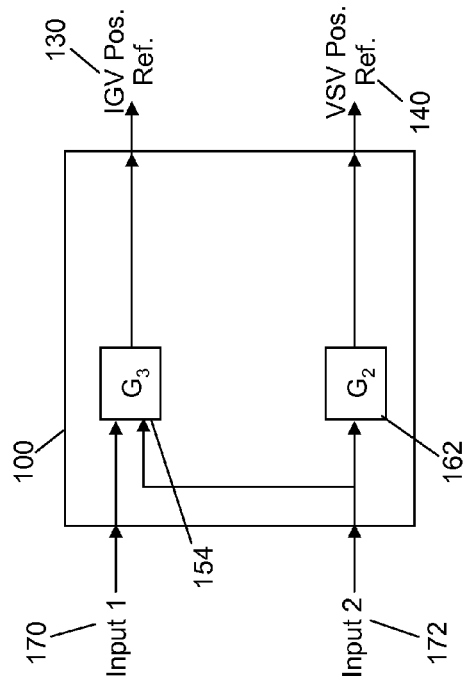
FIGS. 3-6 show schematic diagrams of variants of a controller, such as that seen in FIGS. 1 and 2, according to embodiments.
Figure 5:
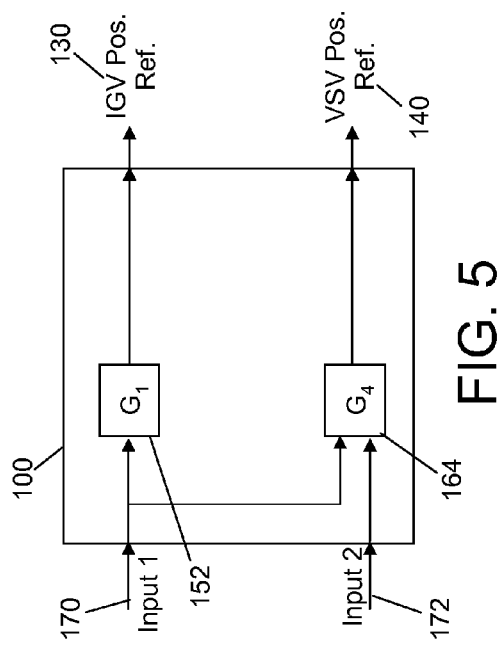

Interdependence may be introduced into the controller 100, such as is illustrated in FIG. 4. Here, second IGV control unit 154 receives not only first input 170, but also second input 172, while first VSV control unit receives only second input 172, so that VSV control acts as a master and IGV control acts as a slave. Alternatively, as seen in FIG. 5, first input 170 may be supplied to both first IGV control unit 152 and second VSV control unit 164, with second VSV control unit 164 also receiving second input 172, so that IGV control acts as a master and VSV control acts as a slave.

Figure 6:
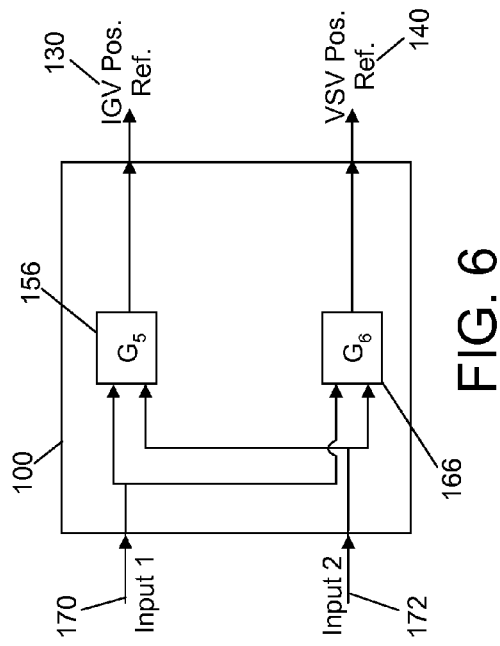

For more refinement, additional interaction may be added, such as the example seen in FIG. 6. For example, multiple signals may be fed to a control unit and/or to multiple control units. Alternatively, various signals and/or commands and/or inputs may be combined using a summing junction, a compensator, or another suitable device to provide a single signal that can be used as an input to another device, such as a control unit in controller 100. A summing junction is a device that receives multiple inputs and produces one or more outputs responsive to the multiple inputs and/or other factors. In this example, a summing junction receives two input values and produces a single output value that takes the two input values into account. The output value can be, in embodiments, an adjusted value of a provided compressor property or compression system property, where one or more input values is a measured compressor property or compression system property. More input values could be received and/or more output values could be produced within the scope of embodiments, as appropriate, and/or as necessary. It should be noted that where a component of embodiments is described as providing, measuring, receiving, sending, determining, or otherwise using a compressor property, a compression system property might be used, if appropriate and/or desired.

In the example shown in FIG. 6, first input 170 may be supplied to third IGV control unit 156 and to third VSV control unit 166, and second input 172 may be supplied to third VSV control unit 166 and to third IGV control unit 156. Third IGV control unit 156 combines first input 170 and second output 172 to produce IGV position reference command 130, and third VSV control unit 166 combines first input 170 and second input 172 to produce VSV position reference command 140, so that IGV control and VSV control are coupled.

Figure 7:
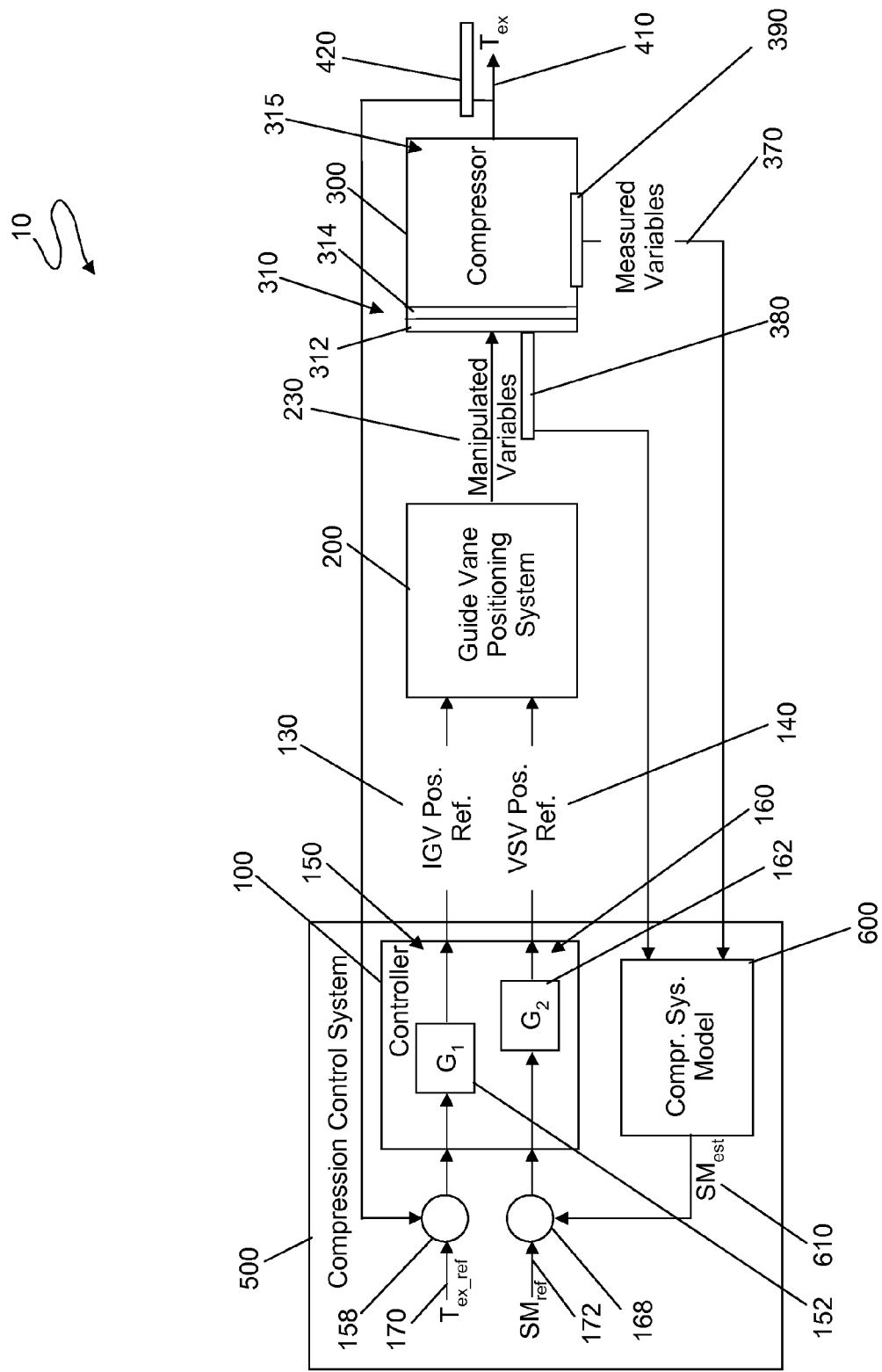
FIG. 7 shows a schematic diagram of a compression control system according to embodiments.

FIG. 7 shows an embodiment in which controller 100 of compression control system 500 employs independent IGV and VSV control channels 150, 160, to some extent, and includes an IGV control unit 152 and a VSV control unit 162. At least a first device is configured to communicate with compression control system 500 to provide a first compressor property value to compression control system 500. A first device in embodiments may include a memory in which a reference value of a property is stored, a sensor, or other suitable device as will be described below that can provide an input value to first IGV control unit 152. Similarly, at least a second device is configured to communicate with compression control system 500 to provide a second compressor property value to compression control system 500. A second device in embodiments may include a memory in which a reference value of a property is stored, a sensor, or other suitable device as will be described below that can provide an input value to first VSV control unit 162. The first IGV control unit 152 produces IGV reference command 130, and the first VSV control unit produces VSV reference command 140. Guide vane positioning system 200 issues an IGV position command (IGV angle 320, one of manipulated variables 230) responsive to at least IGV position reference command 130, and issues a VSV position command (VSV angle 330, one of manipulated variables 230).

While first IGV control unit 152 may receive a measured first compressor property value directly, such as by communicating directly with a first device, such as a sensor, embodiments employ an IGV summing junction 158. IGV summing junction 158 is configured to communicate with at least one of the first and second devices, such as a memory storing a reference value and a sensor, and to provide an adjusted first compressor property value to first IGV control unit 152. For example, IGV summing junction 158 may receive a reference exhaust temperature value $T_{ex\_ref}$ via first input 170, and a measured exhaust temperature value $T_{ex}$ via measured external variables 410, which may be provided by third sensors 420, to produce an adjusted exhaust temperature that it sends or provides to first IGV control unit 152.

Similarly, while first VSV control unit 162 may receive a measured second compressor property value directly, such as by communicating directly with a second device, such as a sensor, embodiments employ a VSV summing junction 168. VSV summing junction 168 is configured to communicate with at least one of the first and second devices, such as a memory storing a reference value and a sensor or other device, and to provide an adjusted second compressor property value to first VSV control unit 162. In embodiments, VSV summing junction is configured to communicate with compression system model 600 from which it may receive a compressor property value, such as estimated stall margin. In such embodiments, compression system model 600 is configured to communicate with at least one second device, such as first and/or second sensors 380, 390. Compression system model 600 produces estimated compressor property value, such as estimated stall margin value $SM_{est}$, responsive to the at least one second device and/or to a respective compressor property. For example, VSV summing junction 168 may receive a reference stall margin $SM_{ref}$ value via second input 172 and an observed or estimated value of stall margin $SM_{est}$ from compression system model 600 to produce an adjusted stall margin value that it sends or provides to first VSV control unit 162. Because compression system model 600 produces $SM_{est}$ using measured manipulated variables 230, which may include measured IGV and VSV positions/angles and may be provided by first sensors 380, there is some coupling of IGV and VSV control, thus differing from the independent controls of FIG. 3. Measured variables 370 may include, for example, pressure and temperature values from various points within compressor 300, as well as rotational speed of various components of compressor 300, such as rotors and/or output shaft(s). Measured variables 370 may be provided by second sensors 390 in embodiments. Using embodiments as described may yield more efficient operation and/or more power output from compression system 10.

Figure 8:
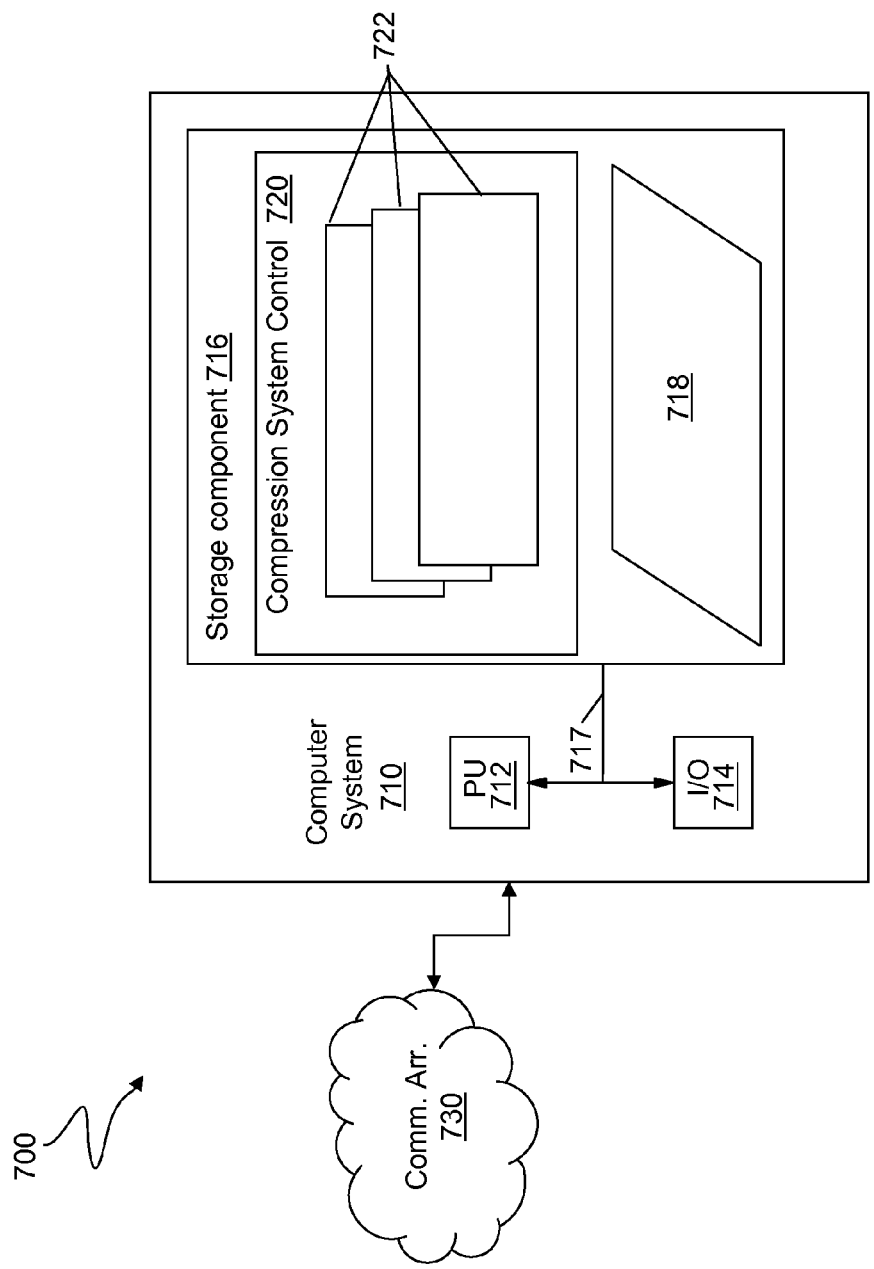
FIG. 8 shows a schematic diagram of a computing system that may implement embodiments of the invention described herein.

Turning again to the drawings, FIG. 8 shows an illustrative environment 700 for a compression system control computer product according to an embodiment. To this extent, environment 700 includes a computer system 710, such as an compressor controller or controller, that may perform a process described herein in order to execute a compression system control method according to embodiments. In particular, computer system 710 is shown including a compression system control program 720, which makes computer system 710 operable to control a compression system with independently adjustable IGVs and VSVs by performing a process described herein, such as an embodiment of the compression system control method discussed below with reference to FIG. 9.

Computer system 710 is shown including a processing component or unit (PU) 712 (e.g., one or more processors), an input/output (I/O) component 714 (e.g., one or more I/O interfaces and/or devices), a storage component 716 (e.g., a storage hierarchy), and a communications pathway 717. In general, processing component 712 executes program code, such as compression system control program 720, which is at least partially fixed in storage component 716, which may include one or more computer readable storage medium or device. While executing program code, processing component 712 may process data, which may result in reading and/or writing transformed data from/to storage component 716 and/or I/O component 714 for further processing. Pathway 717 provides a communications link between each of the components in computer system 710. I/O component 714 may comprise one or more human I/O devices, which enable a human user to interact with computer system 710 and/or one or more communications devices to enable a system user to communicate with computer system 710 using any type of communications link. In embodiments, a communications arrangement 430, such as networking hardware/software, enables computing device 710 to communicate with other devices in and outside of a substation in which it is installed. To this extent, compression system control program 720 may manage a set of interfaces (e.g., graphical user interface(s), application program interface, and/or the like) that enable human and/or system users to interact with compression system control program 720. Further, compression system control program 720 may manage (e.g., store, retrieve, create, manipulate, organize, present, etc.) data, such as compression system control data 718, using any solution.

Computer system 710 may comprise one or more general purpose computing articles of manufacture (e.g., computing devices) capable of executing program code, such as compression system control program 720, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture; one or more memory/storage components of a computing device; paper; and/or the like. Examples of memory/storage components include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement a compression system control method and/or system and/or computer product that operates independently adjustable IGVs and VSVs of a compression system to improve operating efficiency and/or output power and/or other characteristic as appropriate.

The computer program code may be written in computer instructions executable by the controller, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these and/or others now known and/or later developed and/or discovered. To this extent, compression system control program 720 may be embodied as any combination of system software and/or application software.

Further, compression system control program 720 may be implemented using a set of modules 722. In this case, a module 722 may enable computer system 710 to perform a set of tasks used by compression system control program 720, and may be separately developed and/or implemented apart from other portions of compression system control program 720. As used herein, the term "component" means any configuration of hardware, with or without software, which implements the functionality described in conjunction therewith using any solution, while the term "module" means program code that enables a computer system 710 to implement the actions described in conjunction therewith using any solution. When fixed in a storage component 716 of a computer system 710 that includes a processing component 712, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 710.

When computer system 710 comprises multiple computing devices, each computing device may have only a portion of compression system control program 720 fixed thereon (e.g., one or more modules 722). However, it is understood that computer system 710 and compression system control program 720 are only representative of various possible equivalent computer systems that may perform a process described herein. To this extent, in other embodiments, the functionality provided by computer system 710 and compression system control program 720 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 710 includes multiple computing devices, the computing devices may communicate over any type of communications link. Further, while performing a process described herein, computer system 710 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

Figure 9:
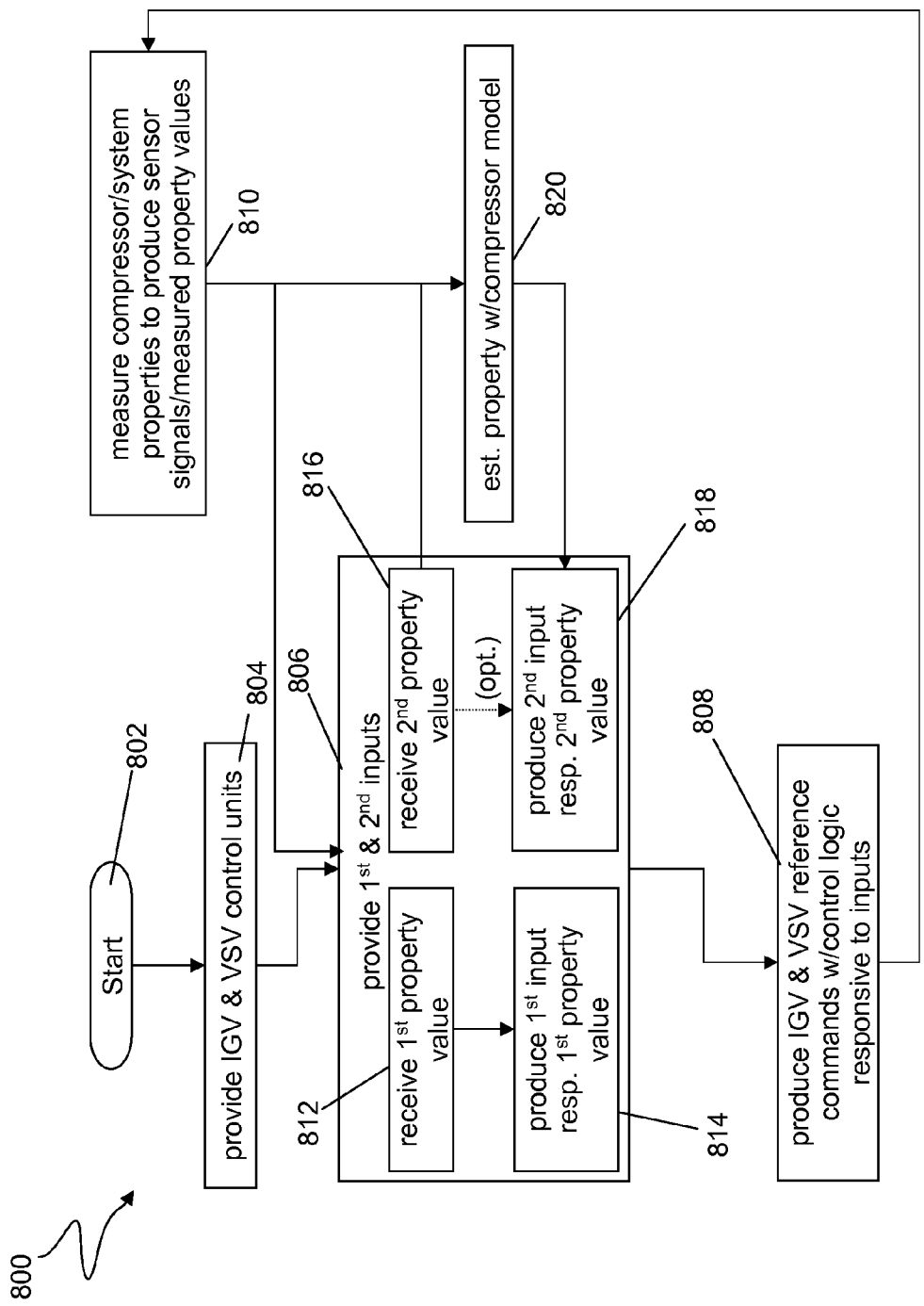
FIG. 9 shows a schematic flow diagram of a method of controlling a compression system according to embodiments.

As discussed herein, compression system control program 720 enables computer system 710 to implement a compression system control product and/or method, such as that shown schematically in FIG. 9. With reference to FIG. 9, a method 800 according to embodiments starts (block 802) and IGV and VSV control units are provided (block 804), such as by loading program code for forming them from a storage component, for example. First and second inputs are provided (block 806) and IGV and VSV reference commands are produced with adjusted property values from the IGV and VSV control units using the first and second inputs (block 808). Properties of the compressor are measured to produce sensor signals representing measured compressor/compression system property values (block 810), which may be used in providing the first and second inputs. The method may continue until the compression system is shut down.

Where feedback signals are used in providing inputs, a first sensor signal/property value may be received as a first feedback signal (block 812) and the first input may be produced responsive to the first feedback signal/property value (block 814). For example, a summing junction may be used to produce the first input using the first feedback signal and a reference value. Additionally, a second sensor signal/property value may be received as a second feedback signal (block 816), and the second input may be produced responsive to the second feedback signal/property value (block 818). Like the first input, a summing junction may, for example, be used to produce the second input responsive to the second feedback signal/property value and a reference value. In embodiments including a compression system model, the second feedback signal may be provided by the model as, for example, an estimated value of a property of the compressor (block 820). In such embodiments, the estimated value produced by the compression system model may be determined responsive to one or more sensor signals/property values. The examples of inputs provided to summing junctions of embodiments are not intended to be limiting and may be greater in number and/or different in nature as appropriate or necessitated by a given compression system. It should be recognized that the order in which steps described herein are performed may be changed within the scope of embodiments of the invention disclosed and claimed herein. The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

With reference again to FIG. 8, computer system 710, when such is employed to effect embodiments, such as that described with reference to FIG. 9 above, may obtain compression system control data 718 using any solution. For example, computer system 710 may generate and/or be used to generate compression system control data 718, retrieve compression system control data 718 from one or more data stores, receive compression system control data 718 from another system or device in or outside of the substation, such as from sensors 380, 420, and/or the like.

In another embodiment, the invention provides a method of providing a copy of program code, such as compression system control program 720 (FIG. 8), which implements some or all of a process described herein, such as that shown schematically in and described with reference to FIG. 9. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer readable medium. In either case, the set of data signals may be transmitted/received using any type of communications link.

In still another embodiment, the invention provides a method of generating a system for implementing a compression system control product and/or method. In this case, a computer system, such as computer system 710 (FIG. 8), can be obtained (e.g., created, maintained, made available, etc.), and one or more components for performing a process described herein can be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

The corresponding structures, materials, acts, and equivalents of any and all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A compression system comprising:
   a compressor;
   at least one adjustable inlet guide vane (IGV);
   at least one variable stator vane (VSV) downstream from the at least one IGV, the at least one VSV being adjustable independently of the at least one IGV and the at least one IGV being adjustable independently of the at least one VSV;
   a compression control system including a controller, the controller including an IGV control unit and a VSV control unit;
   at least a first device configured to communicate with the compression control system and to provide at least a first compressor property value to the compression control system;
   at least a second device configured to communicate with the compression control system and to provide at least a second compressor property value to the compression control system, wherein the second compression property value includes an estimated stall margin and an estimated efficiency of the compression system;

at least a first summing junction configured to communicate with the IGV control unit, the first summing junction also being configured to communicate with at least one of the first and second devices, and to send, responsive to the at least one of the first and second devices, first output value to the IGV control unit;

at least a second summing junction configured to communicate with the VSV control unit, the second summing junction also being configured to communicate with at least one of the first and second devices, and to send, responsive to the at least one of the first and second devices, a second output value to the VSV control unit;

responsive to at least one of the first and second devices, IGV position reference command produced by the IGV control unit independently of the VSV control unit;

responsive to at least one of the first and second devices, a VSV position reference command produced by the VSV control unit independently of the IGV control unit; and a guide vane positioning system configured to communicate with the controller to produce, responsive to at least the IGV position reference command, an IGV position command, and to produce, responsive to at least the VSV position reference command, a VSV position command.

2. The compression system of claim 1, wherein the first device is configured to measure a first compressor property and to provide to the first summing junction a measured first compressor property value.

3. The compression system of claim 2, wherein the first compressor property is exhaust temperature.

4. The compression system of claim 1, wherein the second device is configured to measure a second compressor property and to provide to the second summing junction a measured second compressor property value.

5. The compression system of claim 1, further comprising a compression system model configured to communicate with at least one of the first and second devices and to produce, responsive to the at least one of the first and second devices, a third output value used by at least one of the IGV control unit and the VSV control unit.

6. The compression system of claim 5, wherein the third output value is an estimated value of a property of the compression system.

7. A compression system control method, the compression system including a compressor, a guide vane positioning system, at least one adjustable inlet guide vane (IGV) responsive to the guide vane positioning system, and at least one variable stator vane (VSV) responsive to the guide vane positioning system, the at least one adjustable IGV being controlled independently of control of the at least one VSV, and the at least one VSV being controlled independently of the at least one IGV, the method comprising:

providing an IGV control unit configured to communicate with at least a first device and to receive at least a first compressor property value therefrom wherein the first compressor property value is an adjusted first compressor property value, and the first device is a first summing junction configured to provide, responsive to at least a first compressor reference value, the adjusted first compressor property value to the IGV control unit;

producing, by a controller, with the IGV control unit, responsive to at least the first compressor property value and independently of control of the at least one VSV, an IGV position reference command and sending the IGV position reference command to the guide vane positioning system;

providing a VSV control unit configured to communicate with at least a second device and to receive at least a second compressor property value therefrom, wherein the second compressor property value includes an estimated stall margin and an estimated efficiency of the compression system wherein the second compressor property value is an adjusted second compressor property value, and the second device is a second summing junction configured to provide, responsive to at least a second compressor reference value, the adjusted second compressor property value to the VSV control unit; and producing with the VSV control unit, responsive to at least the second compressor property value and independently of control of the at least one IGV, a VSV position reference command and sending the VSV position reference command to the guide vane positioning system.

8. The method of claim 7, further comprising providing a first sensor configured to measure a first compressor property and to provide to the first summing junction a measured first compressor property value.

9. The method of claim 7, further comprising providing a second sensor configured to measure a second compressor property and to provide to the compression control system a measured second compressor property value.

10. The method of claim 7, further comprising providing at least a third sensor configured to measure a respective compressor property and to provide, a respective measured compressor property value, providing a compression system model configured to communicate with the at least a third sensor to produce, responsive to at least a measured third compressor property value, the second compressor property value.

11. A non-transitory computer program product for controlling a compression system, the compression system including at least one compressor, at least one adjustable inlet guide vane (IGV), at least one variable stator vane (VSV), the at least one adjustable IGV being adjustable independently of the at least one VSV, the at least one VSV being adjustable independently of the at least one adjustable IGV, and at least one guide vane positioning system with at least one IGV positioning system configured to change a respective position of the at least one IGV and at least one VSV positioning system configured to change a respective position of the at least one VSV responsive to a computing device of a compression control system in communication with the at least one guide vane positioning system, the computer program product comprising instructions in the form of computer executable program code stored on a non-transitory computer readable storage medium in communication with the computing device, and including:

program code for using an IGV control unit to produce an IGV reference command responsive to at least a first device configured to provide a first compressor property value;

program code for forming a first summing junction, for producing with the first summing junction, responsive to the first compressor property value provided by the first device, an adjusted first compressor property value, and for sending the adjusted first compressor property value to the IGV control unit;

program code for using a VSV control unit to produce a VSV reference command responsive to at least a second device configured to provide a second compressor property value, wherein the second compressor property value includes an estimated stall margin and an estimated efficiency of the compression system;

program code for forming a second summing junction, for producing with the second summing junction, responsive to the second compressor property value provided by the second device, an adjusted second compressor property value, and for sending the adjusted second compressor property value to the VSV control unit;

program code for producing an IGV position command responsive to the IGV reference command and independently of the VSV control unit, and program code for sending the IGV position command to the at least one IGV positioning system; and program code for producing a VSV position command responsive to the VSV reference command and independently of the IGV control unit, and program code for sending the VSV position command to the at least one VSV positioning system.

12. The non-transitory computer program product of claim 11, wherein the second device includes at least one sensor configured to measure a second compressor property and to provide to the compression control system a measured second compressor property value as the second compressor property value.

13. The non-transitory computer program product of claim 12, further comprising program code for forming a compression system model, for producing with the compression system model, responsive to the second compressor property value, an estimated third property value of the compression system, and for sending the estimated third property value to the second summing junction.

14. The non-transitory computer program product of claim 13, wherein the sensor measures at least one of exhaust temperature, pressure, and flow rate.

* * * * *